United States Patent [19]

Robert

[11] 4,353,267

[45] Oct. 12, 1982

[54] CONTROL ROD OR POWER TRANSMISSION ROD

[75] Inventor: Daniel Robert, Saint Vallier sur Rhone, France

[73] Assignee: Societe Anonyme de Recherches de Mecanique Appliquee, Saint Vallier sur Rhone, France

[21] Appl. No.: 133,397

[22] Filed: Mar. 24, 1980

[30] Foreign Application Priority Data

Mar. 26, 1979 [FR] France .............................. 79 07980

[51] Int. Cl.³ ............................................. G05G 1/00
[52] U.S. Cl. ................................................. 74/579 R
[58] Field of Search ............................ 74/579 R, 581; 416/134 A

[56] References Cited

U.S. PATENT DOCUMENTS

| | | | |
|---|---|---|---|
| 3,475,988 | 11/1969 | Ditlinger et al. | 74/579 R |
| 3,532,308 | 10/1970 | Courtney et al. | 74/579 |
| 3,692,361 | 9/1972 | Narsson | 74/579 R |
| 4,038,885 | 8/1977 | Jonda | 74/579 R |
| 4,255,087 | 3/1981 | Wackerle et al. | 416/134 A |

*Primary Examiner*—Kenneth Dorner
*Attorney, Agent, or Firm*—Young & Thompson

[57] ABSTRACT

The invention relates to a control rod or power transmission rod of tubular shape whose ends are provided with bearings and which is formed of continuous fibres or wires coated with resin and wound around internal elements of the bearings. To provide the rod with a high transverse strength, the fibres or wires are wound on the internal elements of the bearings at an angle greater than 180°, for example, 270°, and intersect each other where they leave these elements, so as to avoid forming a plane of weakness liable to fracture.

5 Claims, 5 Drawing Figures

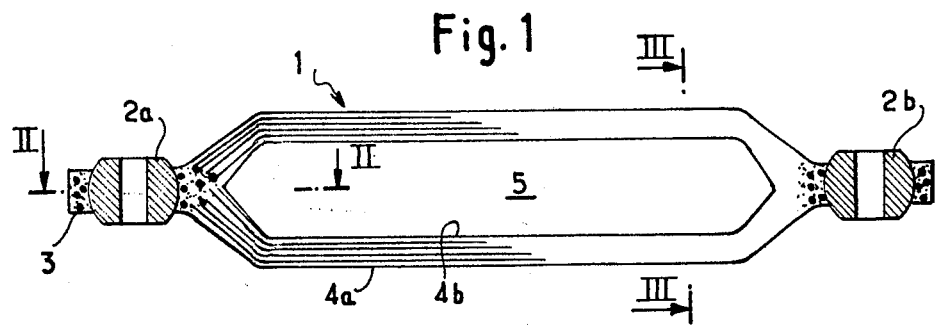
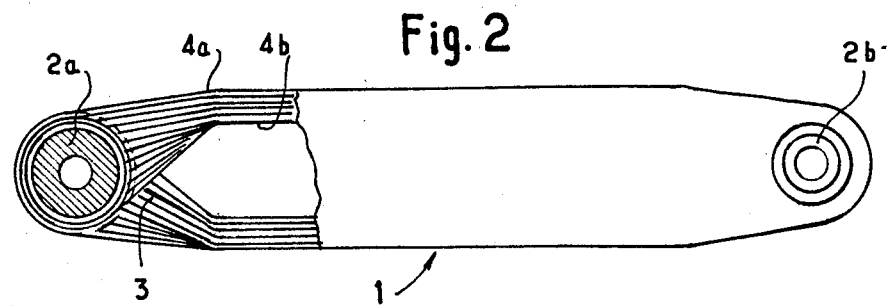
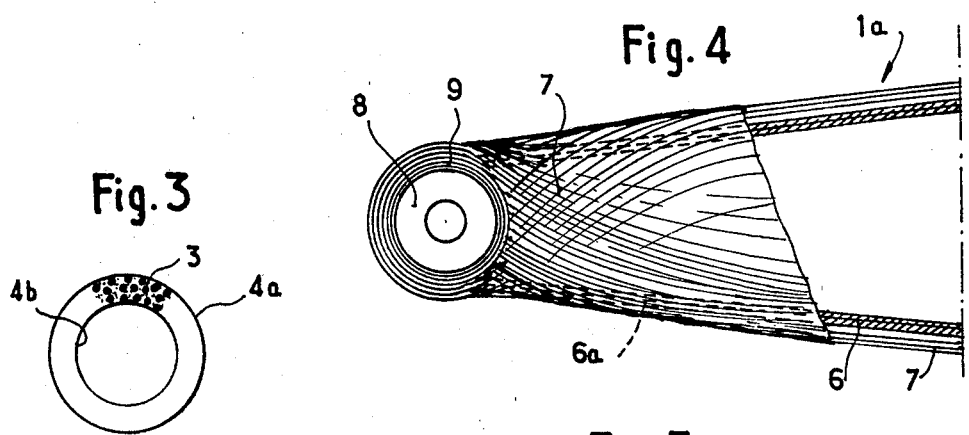
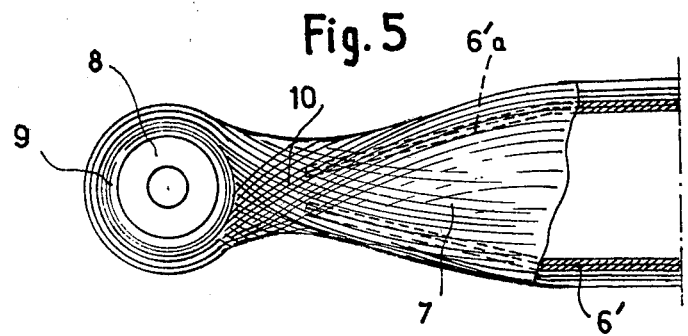

CONTROL ROD OR POWER TRANSMISSION ROD

BACKGROUND OF THE INVENTION

1. Field of the Invention

The present invention relates to a control or power transmission rod of a tubular shape whose ends are provided with bearings and which is formed of continuous fibres or wires coated with resin and wound around the internal elements of the bearings.

2. Description of the Prior Art

Control and power transmission rods comprising a tubular body constituted by high resistance fibres agglomerated by a polymerised synthetic resin, and provided with articulations at their ends are at present known. In most rods of this type constructed at present, each end is frusto-conical and surrounds a metallic connector designed to receive the articulations and comprising a frusto-conical bearing of the same shape on which the end of the body is fixed by way of a collar.

The British Pat. No. 1,162,022 however discloses a tubular rod comprising at each of its ends a bearing having strips of continuous wire wound around it in order to form a series of superposed layers. These wires are coated with a polyurethane based compound which is heated after winding. This rod is lighter than the rod having a metallic connector and has improved properties. The wires are, however, connected along parallel paths. Consequently, although the rod has a high resistance to traction or compression, it is very fragile in the transverse direction. It may easily split along a plane parallel to its axis.

SUMMARY

The rod of the invention is characterised in that the fibres or wires are wound on the internal elements of the bearings at an angle greater than 180° and intersect where they leave these internal elements. As the fibres or threads are tangled in this way, they prevent any plane of fracture and the rod has a high transverse resistance. In addition, the length of adhesion on the ends of the rod is considerably increased.

The rod may possibly comprise a mandrel on which the fibres or wires are disposed. This mandrel may extend to the internal elements of the bearings. In this case, the fibres or wires tend to apply these internal elements onto the mandrel in such a way that the rod has an excellent resistance to compression. The mandrel may also step at a certain distance from the internal elements of the bearings. The wires may then be crossed in such a way that they form a comparatively slight angle to the longitudinal direction of the rod. The internal elements of the bearings are only connected to the body of the rod by the intersecting fibres or wires which fill the space between the mandrel and the bearing elements; a rod of this type has a high tensile strength.

BRIEF DESCRIPTION OF THE DRAWINGS

FIG. 1 is an axial section of a rod provided with swivel bearings at its ends;

FIG. 2 is an elevation, with a partial section along the line II—II of FIG. 1.

FIG. 3 is a transverse section along the line III—III of FIG. 1;

FIG. 4 is an elevation, in partial section, of part of a further embodiment;

FIG. 5 is the same type of view as FIG. 4 of a third embodiment.

Three embodiments of the rod of the invention are described in the following description by way of non-limiting examples, with reference to the drawings.

In FIGS. 1 to 3, a rod 1 comprises, at each of its ends, an internal ball bearing element 2a or 2b, the external element of this ball being constituted by the rod itself. A continuous fibre or wire 3 of carbon, Kevlar or glass, coated with resin, or a strip of juxtaposed continuous fibres or wires is wound at an angle greater than 180° and preferably at least 270° about the internal swivel elements from which it extends along an intersecting path in order to form the body of the rod which is tubular, the external contour of which is shown at 4a and the internal contour at 4b, the rod having a cavity 5 in its centre. The resin is polymerised after winding.

In the embodiment of FIG. 4, the rod 1a comprises a glass fibre support 6 forming a mandrel, the median portion of which is cylindrical whilst its ends 6a are frusto-conical. Superposed layers of strips of carbon fibres 7 are disposed on this mandrel. The strips are wound on the internal elements 8 of end bearings which are supported on the mandrel 6, the strips extending from the mandrel and intersecting one another; these internal elements may be cylindrical, spherical or in the shape of truncated spheres, as in the embodiment of FIGS. 1 to 3. Auxiliary carbon wires 9 are wound on the element 8 before placing of the strips 7. This rod has a high compression strength. In addition, the strips adhere to the frusto-conical ends 6a of the mandrel over a length which is considerably greater than if they were longitudinally disposed.

In the embodiment of FIG. 5, the rod also comprises a glass fibre support 6' forming a mandrel, the ends 6'a of which are frusto-conical. However the internal elements 8 of the end bearings are located at a certain distance from the ends of the mandrel. The wires or fibre strips 7 are wound on the elements 8 at an angle of at least 270° and extend from these elements at a relatively slight angle to the longitudinal direction of the rod, which enables them to be obliquely arranged over a portion of the cylindrical part of the mandrel 6'. The wires or strips 7 intersect in a narrow area 10 which fills the space between an element 8 and the corresponding end 6'a of the mandrel 6', which prevents any constriction in the case in which a tensile force is applied, the rod having a high resistance to this.

It is obvious that the present invention should not be considered to be limited to the embodiments described and illustrated, but covers all the variants of these.

I claim:

1. An elongated tubular control rod having a bearing at each end, the rod being comprised by at least one continuous resin-coated filament that extends lengthwise along one side of the rod, about the bearing at one end of the rod, crosses over itself and extends along the other side of the rod, about the bearing at the other end of the rod, crosses over itself and extends again along one side of the rod, the regions in which the filament crosses over itself being disposed adjacent said bearings whereby a plane of weakness is avoided.

2. An assembly as recited in claim 1 and further comprising a mandrel around which said filament is disposed to form the rod.

3. An assembly as recited in claim 2 wherein the ends of the mandrel extend to closely adjacent the bearings.

4. An assembly as recited in claim 2 wherein the ends of the mandrel are spaced from the bearings.

5. An assembly as recited in claim 1 wherein the resin is polymerised.

* * * * *